United States Patent [19]

Sasaki et al.

[11] Patent Number: 4,617,897
[45] Date of Patent: Oct. 21, 1986

[54] INTAKE SYSTEM FOR INTERNAL COMBUSTION ENGINES

[75] Inventors: Junzo Sasaki; Mitsuo Hitomi; Ueda Kazuhiko, all of Hiroshima, Japan

[73] Assignee: Mazda Motor Corporation, Japan

[21] Appl. No.: 693,297

[22] Filed: Jan. 22, 1985

[30] Foreign Application Priority Data

| Jan. 23, 1984 | [JP] | Japan | 59-10646 |
| Jan. 23, 1984 | [JP] | Japan | 59-10647 |
| Jan. 23, 1984 | [JP] | Japan | 59-10648 |
| Jan. 30, 1984 | [JP] | Japan | 59-14901 |

[51] Int. Cl.⁴ .......................................... F02B 15/00
[52] U.S. Cl. ........................ 123/432; 123/52 MB; 123/188 M
[58] Field of Search ............ 123/432, 52 M, 52 MB, 123/188 M

[56] References Cited

U.S. PATENT DOCUMENTS

| 2,835,235 | 5/1958 | Gassmann | 123/65 A |
| 3,177,854 | 4/1965 | Garcea | 123/52 M |
| 3,370,575 | 2/1968 | Soubis | 123/52 M |
| 4,318,386 | 3/1982 | Showalter et al. | 123/188 M |
| 4,512,311 | 4/1985 | Sugiyama | 123/432 |

FOREIGN PATENT DOCUMENTS

48-58214 8/1973 Japan .
56-15819 9/1981 Japan .

Primary Examiner—E. Rollins Cross
Attorney, Agent, or Firm—Gerald J. Ferguson, Jr.; James E. Bryan; Michael P. Hoffman

[57] ABSTRACT

An intake system of an internal combustion engine is provided with a cross-sectional area changing means and a length changing means so that the cross-sectional area and/or the length of the intake system may be changed according to the change in the engine speed. Basically, at a high engine speed, the cross-sectional area is enlarged and the length is also enlarged to obtain an inertia supercharging effect at the high engine speed. By making the timing of changing the area different from that of changing the length, it is possible to maximize the inertia supercharging effect over a wide range of engine speeds. The cross-sectional area may be changed from SMALL to LARGE before the length is changed from LONG to SHORT, or after the length is changed from LONG to SHORT. The length may be changed stepwisely or continuously.

27 Claims, 14 Drawing Figures

INTAKE SYSTEM FOR INTERNAL COMBUSTION ENGINES

BACKGROUND OF THE INVENTION

1. Field of the Invention

This invention relates to an intake system for internal combustion engines, and more particularly to an intake system for internal combustion engines in which the length of the intake system is varied or changed to enhance the output power of the engine by utilizing the inertia supercharging effect.

2. Description of the Prior Art

It has been known in the art to enhance the output power of an internal combustion engine by utilizing the inertia supercharging effect. The inertia supercharging effect is based on the synchronization of the natural frequency of the intake system with the frequency of the pressure change in the intake system caused by the reciprocating motion of the piston in the cylinder of the engine. That is, the pressure wave generated at the cylinder is transmitted through the intake passage and reflected by the surge tank and returned to the cylinder, which is repeated to make a periodical pressure change in the intake system. When the frequency of this pressure change is synchronized with the natural frequency of the intake system determined by the volume of the intake passage and the cylinder, an intake inertia effect is obtained. This is known as the inertia supercharging effect and is discussed in various prior art references such as U.S. Pat. No. 2,835,235 to Gassmann and U.K. Patent Publication No. 2,117,447. Gassmann shows that the length of the intake passage can be changed to obtain or maximize the inertia supercharging effect over a wide range of engine speeds. Further, it has been known to provide a compact arrangement to obtain the inertia supercharging effect by arranging intake passages around the surge tank as disclosed in the above U.K. patent and other printed publications such as Japanese Unexamined Patent Publication Nos. 48(1973)-58214, 56(1981)-115819 and 58(1983)-119919.

The above-mentioned prior art, however, still needs improvement in that the range of engine speeds over which the inertia supercharging effect is obtained is still small and enlargement of the range requires a complicated mechanism.

It is, therefore, desired to enlarge the range of engine speeds over which the inertia supercharging effect is obtained by use of a simple structure or mechanism.

SUMMARY OF THE INVENTION

In view of the above observations regarding the prior art, it is the primary object of the present invention to provide an intake system for internal combustion engines in which the inertia supercharging effect is obtained over a wide range of engine speeds.

A more specific object of the present invention is to provide an intake system for internal combustion engines in which both the length and the cross-sectional area of the intake system can be varied or changed according to the engine speed so that the inertia supercharging effect can be maximized over a wide range of engine speeds.

The intake system for internal combustion engines according to the present invention is characterized in that the length and the cross-sectional area of the intake system or passage can be continuously or stepwisely changed according to the engine speed, whereby the synchronization of the frequency of the pressure change and the natural frequency of the intake system is obtained over a wide range of engine speeds.

The length of the intake passage can be changed by providing a length change-over means in the intake passage which is formed to have different length branch passages that are changed over by the change-over means. The different length branch passages can be arranged around a surge tank.

Alternatively, the length of the intake passage can be changed by providing a length control means in the intake passage which is arranged around a surge tank. That is, a rotatable drum with a communicating port can be provided in the surge tank and a spiral intake passage can be arranged around it so that the effective length of the intake passage can be changed by rotating the drum to change the position of the communicating port thereof relative to the spiral intake passage encircling the surge tank. This type of variable length intake passage is disclosed in Gassmann and a copending U.S. application Ser. No. 591,458 assigned to the assignee of this application.

The cross-sectional area of the intake passage can be changed by dividing the passage into two parallel passages one of which is provided with an ON-OFF valve to effect the change-over of the cross-sectional area of the intake passage. The two divisional passages may be of different cross-sectional area and can be switched to effect area change-over by providing an ON-OFF valve in each divisional passage. Alternatively, only one of the divisional passages may be provided with the valve to change the effective cross-sectional area of the intake passage as a whole.

In accordance with the present invention, the length and the cross-sectional area of the intake system are changeable independently of each other so that the inertia supercharging effect can be obtained over a wider range of engine speeds than in the case where only the length of the intake system is changeable.

In one embodiment, an intake passage is divided into two parallel passages in one of which a valve is provided to close the passage and both of which are changeable in length, so that the cross-sectional area of the intake passage can be changed by closing or opening the valve in one divisional passage and the length of the intake system can be changed as a whole. In this embodiment, the length can be changed in the high speed range where both the divisional passages are open. Further, it is possible to change the length of the passage both in the one-passage mode where only one passage is open and in the two-passage mode where two passages are open, whereby the inertia supercharging effect can be obtained over a very wide range of engine speeds.

As is obvious from the summary of set out above, it is in accordance with the present invention possible to change both the cross-sectional area and the length of the intake system or passage. Accordingly, it is possible to maximize the inertia supercharging effect over a wide range of engine speeds, whereby the output power of the engine can be enhanced over a wide range of engine speeds. Consequently, it is possible to improve not only the output power at a high engine speed but also the performance of the engine at a low engine speed by enhancing the intake flow rate at low engine speed.

DESCRIPTION OF THE PREFERRED EMBODIMENTS

Figures 1, 2:
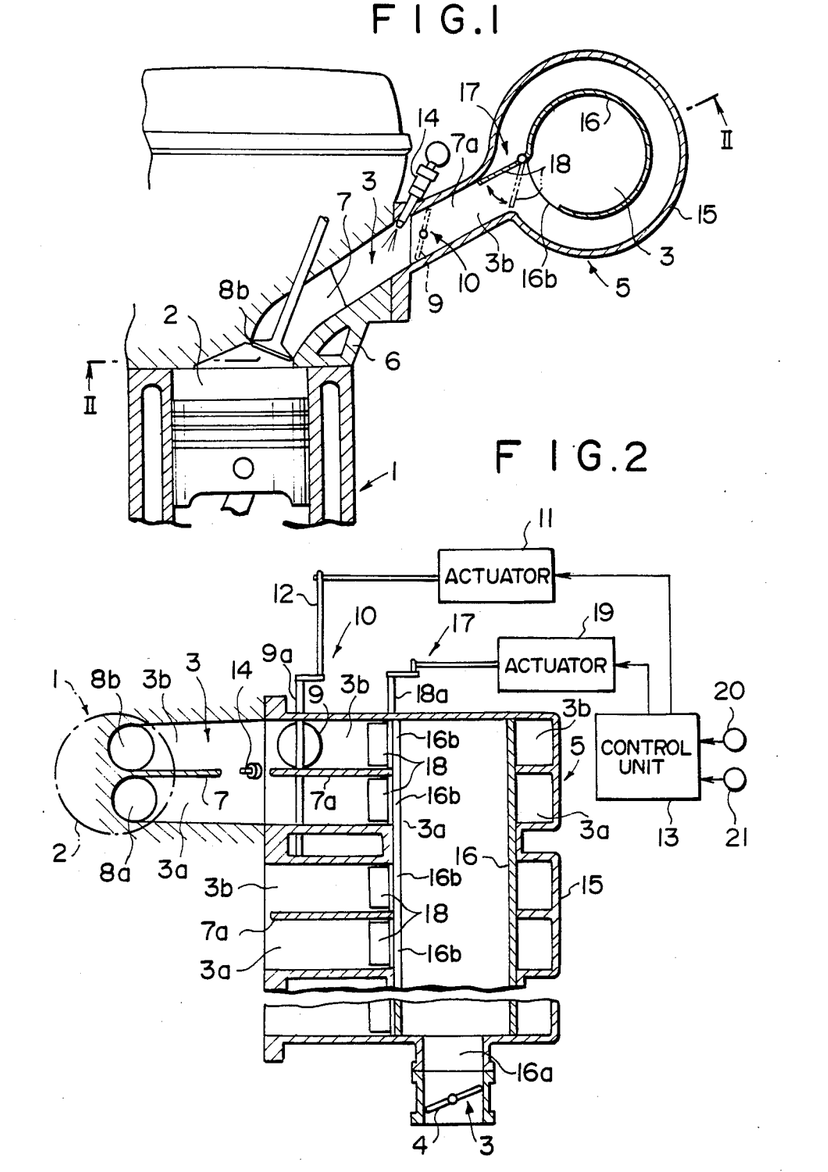
FIG. 1 is a vertical sectional view showing the main portion of a multi-cylinder internal combustion engine provided with the intake system according to an embodiment of the present invention.
FIG. 2 is a cross-sectional view taken along the line II—II in FIG. 1.
Figure 3:
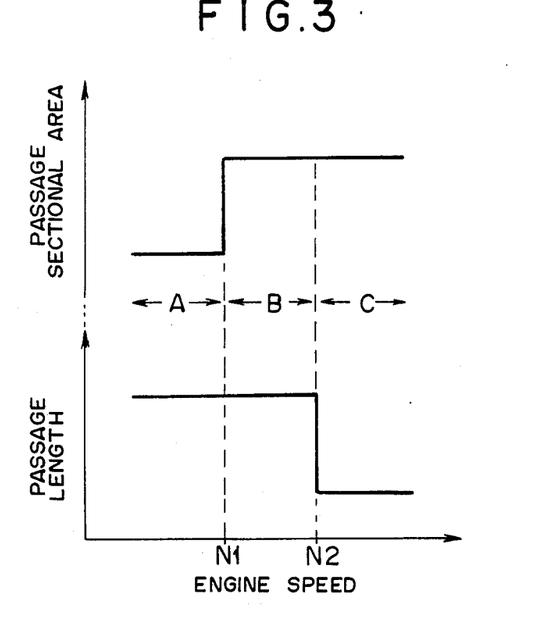
FIG. 3 is a graphical representation showing the relationship between the cross-sectional area and the length of the intake system and the engine speed according to one embodiment of the present invention.
Figure 4:
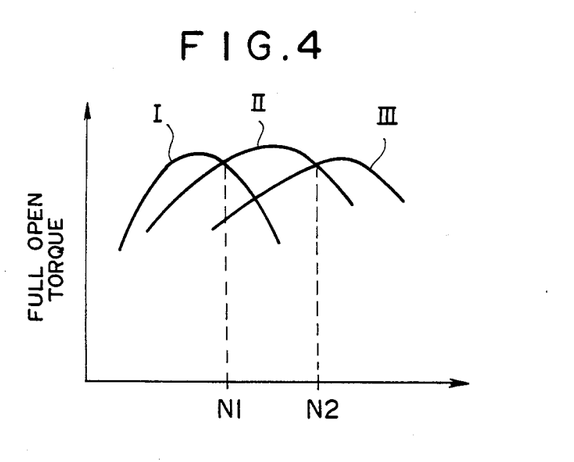
FIG. 4 is a graph showing the relationship between the full-open torque of the engine and the engine speed resulting in the embodiment as shown in FIG. 3.
Figure 5:
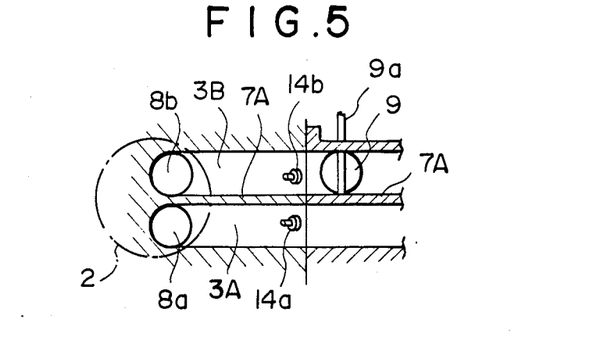
FIG. 5 is a fragmentary sectional view showing another embodiment of the structure of the intake system according to the present invention.
Figure 6:
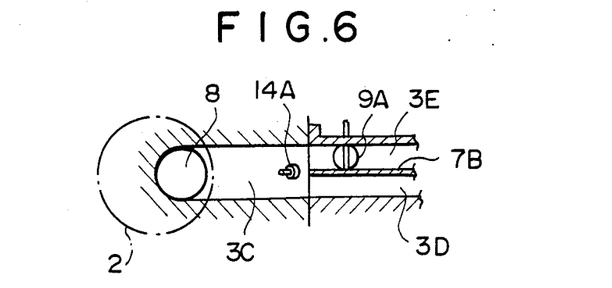
FIG. 6 is a fragmentary sectional view showing still another embodiment of the structure of the intake system according to the present invention.
Figure 7:
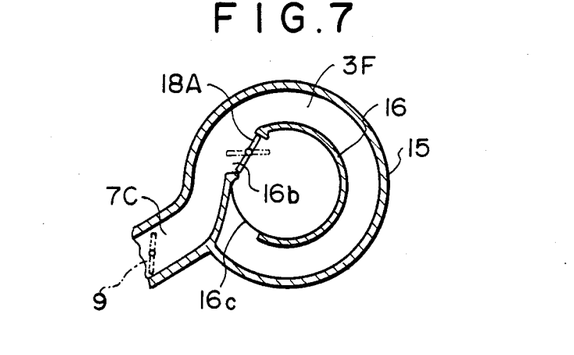
FIG. 7 is a fragmentary sectional view showing a variation of the length change-over structure of the intake system according to the first embodiment of the present invention as illustrated in FIGS. 1 and 2.
Figures 8, 9:
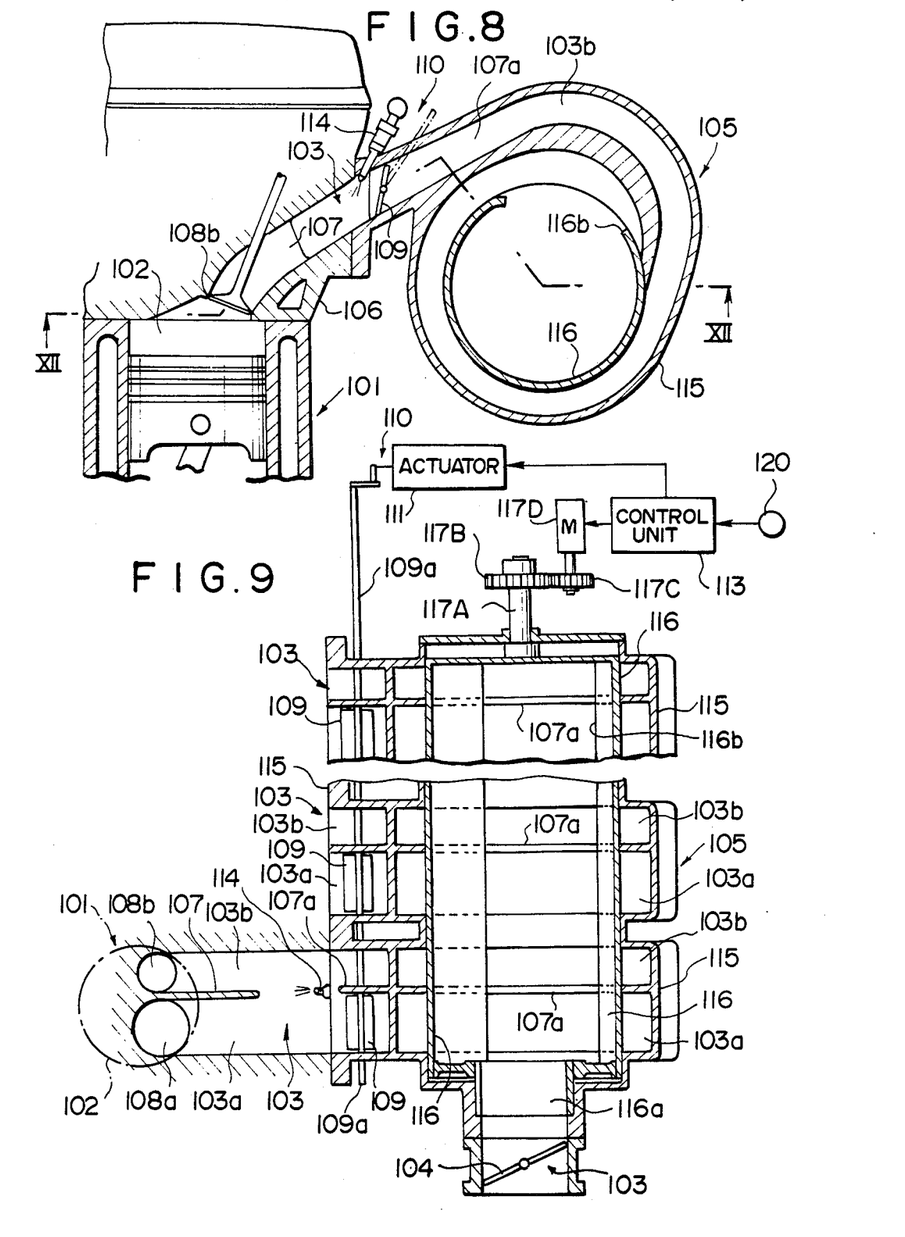
FIG. 8 is a vertical sectional view showing the main portion of a multi-cylinder internal combustion engine provided with the intake system according to a further embodiment of the present invention.
FIG. 9 is a cross-sectional view taken along the line XII—XII in FIG. 8.

Now the present invention will be described in detail with reference to the accompanying drawings showing various embodiments thereof. FIGS. 1 and 2 show a first embodiment thereof, FIGS. 3 and 4 show the performance thereof, FIGS. 5 to 7 show several minor variations thereof, FIGS. 8 and 9 show a second embodiment thereof and FIGS. 10 to 14 show the various performance characteristics of different embodiments.

Referring to FIG. 1, a multi-cylinder internal combustion engine 1 is provided with combustion chambers 2 (only one shown) in the respective cylinders. The combustion chamber 2 is connected with an intake system 3, which is in turn connected with a surge tank 5. As shown in FIG. 2, the surge tank 5 is provided in the intake system 3 downstream of a throttle valve 4. The intake system 3 is divided into several branches downstream of the surge tank 5 so as to be connected to the respective cylinders.

Each cylinder has two intake ports 8a and 8b in the cylinder head 6 thereof and the intake system 3 communicated with the intake ports 8a and 8b is divided into two intake passages 3a and 3b by means of a partition 7. The first intake passage 3a is communicated with the first intake port 8a and the second passage 3b with the second port 8b.

The second intake passage 3b is provided therein with an ON-OFF valve 9 to constitute an intake system area change-over means 10. The valve 9 is secured to a rotation shaft 9a which is in turn connected to an actuator 11 by way of a mechanical linkage 12. The actuator 11 is controlled by an electric signal from a control unit 13 and operates to drive the linkage 12 to close or open the valve 9 based on the electric signal. When the valve 9 is closed, the intake passage 3 has a small cross-sectional area defined only by the first intake passage 3a, and when the valve 9 is opened the intake system 3 has a larger cross-sectional area defined by both the intake passages 3a and 3b. Thus, the cross-sectional area of the intake system 3 is changed over between large and small. The change-over of the cross-sectional area of the intake system 3 is shown in the upper part of the graph of FIG. 3.

Said partition 7 provided in the intake system 3 is partially cut away to make a communication port between the adjacent intake passages 3a and 3b and a fuel injection nozzle 14 is provided at the communication port therebetween as shown in FIGS. 1 and 2. The partition is designated by 7 in the cylinder head side and by 7a in the surge tank side. In this embodiment, the single fuel injection nozzle 14 functions to supply the fuel into both the intake passages 3a and 3b.

Said surge tank 5 is composed of a casing 15 and an internal cylindrical member 16 to define extended parts of the intake passages 3a and 3b between the member 16 and the casing 15. The surge tank 5 is provided therein with a system length change-over means 17 which changes over the length of the intake passages 3a and 3b. The internal cylindrical member 16 defines the main part of the surge tank 5 within the casing 15 and is communicated at an end thereof 16a with the upstream intake system 3 provided with the throttle valve 4 and further communicated with the interior of the casing 15 forming said intake passages 3a and 3b around the cylindrical member 16 by way of an axially extending communication port 16b. The cylindrical member 16 is connected at its outer surface with the inner end of said partition 7a so as to define said intake passages 3a and 3b separately. Said communication port 16b provided in the cylindrical member 16 is opened to said intake passages 3a and 3b so as to connect the interior of the cylindrical member 16 or the main part of the surge tank 5 to the intake passages 3a and 3b. A change-over valve 18 is provided adjacent to the communication port 16b to change over the length of the intake passages 3a and 3b between the longer one in which the intake passages 3a and 3b are composed of the space between the casing 15 and the cylindrical member 16 and the system extending between the surge tank 5 and the combustion chamber 2 and the shorter one in which the intake passages 3a and 3b are composed only of the system between the surge tank 5 and the combustion chamber 2. The solid line in FIG. 1 shows the position of the change-over valve 18 in its SHORT state to directly connect the interior of the cylindrical member 16 to the intake passages 3a and 3b between the surge tank 5 and the combustion chamber 2. The imaginary line in FIG. 1 shows the position of the change-over valve 18 in its LONG state to connect the interior of the cylindrical member 16 to the intake passages 3a and 3b between the surge tank 5 and the combustion chamber 2 by way of the intake passages 3a and 3b extending around the cylindrical member 16 in the casing 15.

Hence, the intake system length change-over valve 18 changes over the effective length of the intake system 3 by changing its position at the end of the partition 7a adjacent the main surge tank defined by the cylindrical member 16. The change-over valve 18 is secured to a rotatable shaft 18a which is actuated by an actuator 19 which in turn is controlled by said control unit 13.

Said control unit 13 is connected with the two actuators 11 and 19 to control the position or state of the ON-OFF valve 9 and the change-over valve 18 thereby changing the cross-sectional area and the length of the intake system 3. The control unit 13 is further connected with an engine speed sensor 20 and a load sensor 21 to receive an engine speed signal and a load signal so as to control the sectional area and the length of the intake system 3 based on the operating condition of the engine as described in detail hereinbelow. Basically, the control unit 13 operates to determine the desirable position of the valves 9 and 18 to maximize the inertia supercharging effect by synchronizing the frequency of the pressure change with the natural frequency of the intake system 3.

Now referring to FIG. 3, an example of the change in the cross-sectional area and the length of the intake system 3 will be described. The abscissa of FIG. 3 represents the engine speed or the revolution number of the engine and the ordinate represents in the upper half the cross-sectional area and in the lower half the length of the intake system 3, respectively. On the ordinate, the values of the area and the length increase upwardly.

In the example as shown in FIG. 3, basically, the area is made small and the length is set long in the low engine speed, and the area is made large and the length is made short in the high engine speed to obtain the inertia supercharging effect. Further, in this example, the timing of changing the length of the intake system 3 is made earlier than that of changing the cross-sectional area thereof. That is, at a low engine speed N1, the cross-sectional area of the intake system 3 is changed from SMALL to LARGE by opening the valve 9, and at a high engine speed N2, the length of the intake system 3 is changed from LONG to SHORT by changing the position of the length change-over valve 18 from the imaginary line position to the solid line position.

Therefore, in the low engine speed range A below the first engine speed N1, the intake system 3 has a small cross-sectional area defined only by the first intake passage 3a and a long length. In the intermediate engine speed range B between the first engine speed N1 and the second engine speed N2, the intake system 3 has a large cross-sectional area defined by the sum of the two intake passages 3a and 3b and a long length. In the high engine speed range C above the second engine speed N2, the intake system 3 has a large cross-sectional area and a short length. Thus, the volume of the intake system 3 is changed in three steps.

According to the control of the volume of the intake system 3 as mentioned above, the engine torque in the full-open throttle state can be changed into three modes I, II and III as shown in FIG. 4. That is, in the low engine speed range (small area, long system), the torque changes as shown by curve I, in the intermediate engine speed range (large area, long system), the torque changes as shown by curve II, and in the high engine speed range (large area, short system), the torque changes as shown by curve III. As obvious from FIG. 4, the first and second engine speeds N1 and N2 at which the area or length of the intake system 3 is changed are determined according to the torque curves I, II and III. That is, where one torque exceeds another, the area or length is changed to obtain as high torque as possible at any stage. Therefore, the inertia supercharging effect is always maintained at high efficiency. Particularly in the high engine speed range where the inertia supercharging effect is desired, the output power is effectively enhanced.

Furthermore, in the low engine speed range, the cross-sectional area is reduced to enhance the intake flow rate so as to improve the combustion performance, and in the high engine speed range the area is enlarged to effectively supply a large amount of fuel to the engine cylinder.

In the above-described embodiment as shown in FIGS. 1 and 2, the cross-sectional area and the length of the intake system 3 are changed in two steps. It will be understood, however, that they can be changed in more steps. In such a case, the member of different volume states of the intake system can be increased and the synchronization can be conducted more finely. For instance, the first and the second intake passages 3a and 3b can be provided with separate ON-OFF valves and the cross-sectional area thereof can be set differently. In such a case, the cross-sectional area can be changed to three different values, i.e. it can be made equal to the sum of the two passage areas, the larger passage area alone or the smaller passage area alone. By combining the two-step length change of the intake system with the three-step area change thereof, it is possible to obtain six different volumes of the intake system.

In the above-described embodiment, the intake system 3 is divided into two intake passages 3a and 3b, and these intake passages 3a and 3b are communicated through a port provided therebetween and a single fuel injection nozzle 14 is provided for the two passages. However, it is possible to completely divide the passages as shown at 3A and 3B in FIG. 5 and provide two fuel injection nozzles 14a and 14b in the respective intake passages 3A and 3B. In such a variation, the intake system 3 is divided by a single partition 7A extending from the combustion chamber 2 and the surge tank. In FIG. 5, other elements illustrated are designated by the same reference numerals as used in FIGS. 1 and 2.

Another variation of the structure of the intake system 3 is shown in FIG. 6, in which a single intake port 8 is provided on the combustion chamber 2 and a single intake psassage 3C is connected thereto. The intake system 3C is divided in the upstream portion thereof by a partition 7B into two intake passages 3D and 3E. In one passage 3E, a valve 9A is provided. Similar to the first embodiment shown in FIG. 2, a single fuel injection nozzle 14A is located in the intake system 3C.

A further variation of the structure of the intake system 3 is shown in FIG. 7, in which the position of the change-over valve 18A is made different from the embodiment shown in FIG. 1. That is, the internal cylindrical member 16 is provided with two communication ports 16b and 16c, in which the first port 16b is provided with a change-over valve 18A similar to said change-over valve 18 and is equivalent to said communication port 16b in the first embodiment shown in FIG. 1 in the sense in that it serves as a port for the short intake system and the second port 16c serves as a port for the long intake system when the change-over valve 18A is in the closed position indicated by the solid line. When the change-over valve 18A is closed as shown by the solid line in FIG. 7, the intake system 3F formed around the cylindrical member 16 is made long, and when it is opened as shown by the imaginary line the intake system 3F is made short. The reference numeral 7C denotes the partition corresponding to said partition 7a (FIGS. 1 and 2), 7A (FIG. 5) or 7B (FIG. 6). The system 3F corresponds to said system 3a, 3b in the first embodiment.

Further, it will be noted that the control of the valves 9 and 18 in the first embodiment and the corresponding valves in the variations can be conducted by means of an actuator which operates in response to a factor such as an exhaust air pressure which varies according to the engine speed.

In the above-described embodiments, the length of the intake system 3 is discretely changed by means of a change-over means. It is possible, however, to continuously change the length by use of a rotatable internal cylindrical member. Such an embodiment will now be described referring to FIGS. 8 and 9.

In FIGS. 8 and 9, the elements similar to those shown in the first embodiment illustrated in FIGS. 1 and 2 are designated by like numerals increased by 100 and no detailed description thereof will be made because such a description would be obvious from the drawings with reference to the first embodiment shown in FIGS. 1 and 2. Accordingly, only the parts different from those shown in FIGS. 1 and 2 will be described in detail hereinbelow.

In the embodiment shown in FIGS. 8 and 9, the casing 115 is not provided with an intake passage length change-over valve such as said valve 18 but is provided with a rotatable internal cylindrical member 116 which has a communication port 116a opened to the intake passage 103b formed around the rotatable cylindrical member 116. As more explicitly illustrated in FIG. 9, the rotatable cylindrical member 116 is rotatably supported in the casing 115 in the condition where an end thereof 116a is communicated with the upstream part of the intake system 103 and the first and second intake passages 103a and 103b are kept separated from each other with the partition 107a slidably contacted with the outer surface of the rotatable cylindrical member 116. As the rotatable cylindrical member 116 is rotated the position of the communication port 116a is changed to change the effective length of the intake system 103 extending around the cylindrical member 116.

The rotatable cylindrical member 116 is connected at one end thereof with a rotating shaft 117A to which a gear 117B is secured. The gear 117B is meshed with another gear 117C which is secured to an output shaft of a motor 117D that is controlled by a control unit 113. The control unit 113 corresponds to said control unit 13 in the first embodiment shown in FIG. 2. An engine speed sensor 120 is connected with the control unit 113 to input an engine speed signal thereto.

In the above-described embodiment as shown in FIGS. 8 and 9, the length of the intake system 3 is continuously changed by rotating the rotatable cylindrical member 116 by actuating the motor 117D based on the signal from the control unit 113.

The cross-sectional area of the intake system is changed by closing or opening the ON-OFF valve 109 by the actuator 111 based on the signal from the control unit 113 exactly in the same manner as in the first embodiment shown in FIGS. 1 and 2.

Figure 10:
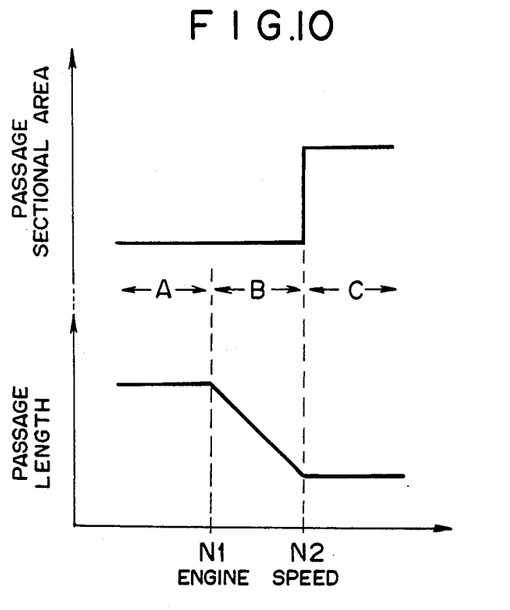
FIG. 10 is a graphical representation showing the relationship between the sectional area and the length of the intake system and the engine speed according to one embodiment based on the structure as shown in FIGS. 8 and 9.
Figure 11:
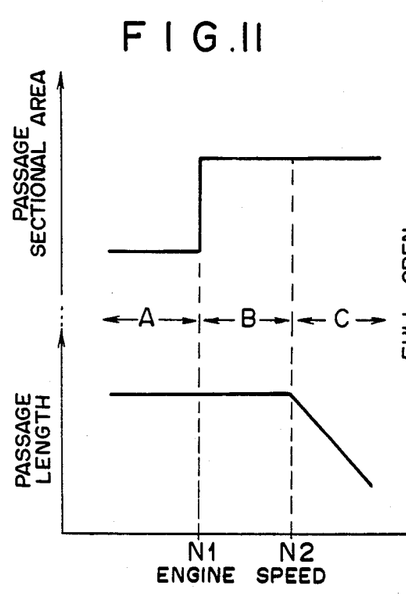
FIG. 11 is a graphical representation similar to FIG. 10 according to another embodiment of the invention.
Figure 13:
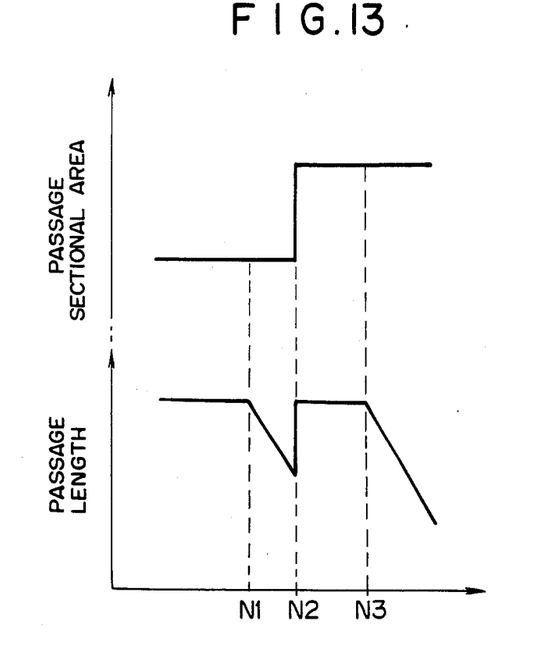
FIG. 13 is a graphical representation similar to FIG. 10 according to still another embodiment of the invention.
Figure 14:
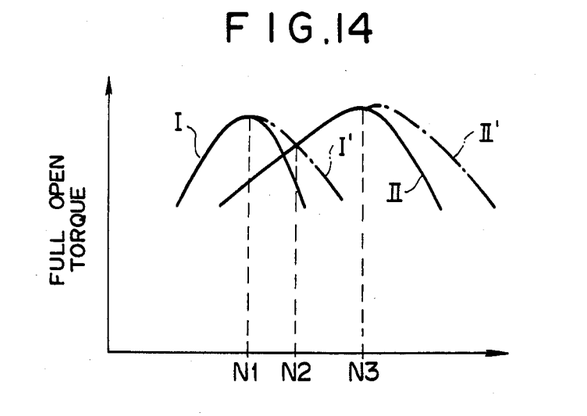
FIG. 14 is a graph similar to FIG. 4 showing the results of the embodiment as shown in FIG. 13.

The various modes of the control of the cross-sectional area and the length of the intake system 103 are shown in FIGS. 10, 11 and 13. FIG. 10 shows a basic mode of control according to the embodiment shown in FIGS. 8 and 9. The cross-sectional area of the intake system 103 is changed from SMALL to LARGE at the engine speed of N2, and the length of the intake passage 103 is changed from LONG to SHORTER at the engine speed of N1 and is continuously shortened up to the engine speed of N2, after which it is kept SHORT as shown in FIG. 10. Therefore, in the low engine speed range A, the area is SMALL and the length is LONG, and is the high engine speed range C the area is LARGE and the length is SHORT, and further in the intermediate engine speed range B the area is SMALL and the length is continuously shortened from LONG and SHORT as the engine speed increases. Accordingly, it is possible to maximize the inertia supercharging effect throughout the various engine speeds. As compared with the former embodiment in which the length is stepwisely changed, more acurate control or synchronization can be effected.

In the embodiment shown in FIG. 9, the cross-sectional area of one intake passage 103a is larger than that of the other passage 103b. Of course, the two intake passages 103a and 103b may be of the same cross-sectional area. Further, in the above embodiment, the length of the two intake passages is changed simultaneously. This may be modified to change the length of the two intake passages separately or subsequently so as to provide more accurate control or synchronization. Furthermore, one of the passages may be fixed in its length so that the length may be changed only in one passage.

It will be understood that the variations of the structure of the intake system as exemplified with reference to FIGS. 5, 6 and 7 in connection with the first embodiment as shown in FIGS. 1 and 2 can also be made in connection with the above embodiment as shown in FIGS. 8 and 9.

FIG. 11 shows another mode of control of the cross-sectional area and the length of the intake system in the embodiment shown in FIGS. 8 and 9. In FIG. 11, in the low engine speed range A the area is made SMALL and the length is made LONG similarly to FIG. 10. In the intermediate engine speed range B, however, the length is maintained LONG whereas the area is made LARGE. In the high engine speed range C, the length is SHORTENED continuously as the engine speed increases whereas the area is maintained LARGE.

Figure 12:
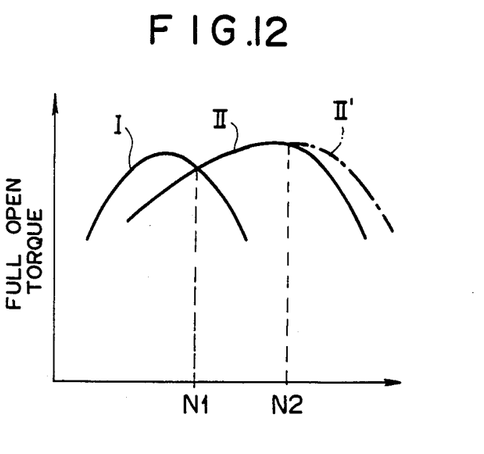
FIG. 12 is a graph similar to FIG. 4 showing the results of the embodiment as shown in FIG. 11.

FIG. 12 shows the torque curves of the engine in which the area and the length of the intake system is controlled according to the mode as shown in FIG. 11. As shown in FIG. 12, the torque curve II for the case where the area is maintained LARGE and the length is maintained LONG is changed as shown by curve II' when the length is SHORTENED as the speed increases, whereby the torque is maintained in the higher level.

FIG. 13 shows still another example of the mode of control of the area and length of the intake system 103. In FIG. 13, the area is changed from SMALL to LARGE at the engine speed of N2. The length is maintained LONG in the low engine speed range between under N1, SHORTENED as the engine speed increases in the second low engine speed range between N1 and N2, returned to its LONG state at N2, maintained again in the LONG state in the third speed range between N2 and N3, and SHORTENED again as the engine speed increases in the high engine speed range over N3, wherein the engine speed N1 is the lowest, N3 is the highest and N2 is between N1 and N2 as shown in FIG. 13. According to such a mode, the torque curve I for the SMALL area and LONG length is changed from I to I′ over N1, and the torque curve II for the LARGE area and LONG length is changed from II to II′ over N3. Thus, the torque is maintained at high levels throughout the various engine speeds.

In the above various examples of the mode of control, the change of the area or the length is conducted several times at various engine speeds and further the length is continuously changed. Therefore, it is possible to gradually change the condition, thereby preventing abrupt change or shock in the torque or output power of the engine. Consequently, smooth control or synchronization can be performed throughout the various engine speeds or condition of the engine.

We claim:

1. An intake system for internal combustion engines comprising a first intake passage extending between a combustion chamber of an engine and a surge tank, a second intake passage extending substantially in parallel to the first intake passage and connecting the combustion chamber with the tank, said second intake passage having a relatively short effective length, cross-sectional area changing means having a valve provided in the second intake passage, said valve having a close position at which said second intake passage is substantially closed and an open position, length changing means for changing the effective length between the combustion chamber and the tank in the first intake passage thereby altering the effective length of said first intake passage to a long state and to a short state, means for operating said cross-sectional area changing means adapted to shift said valve from the close position to the open position and means for operating said length changing means adapted to alter the effective length of said first intake passage from the long state to the short state, said means for operating said cross-sectional area changing means and said means for operating said length changing means being adapted to be actuated independently of each other according to the engine speed so as to form the following three conditions at different speeds:

(i) a first condition in which said first intake passage is in the long state, said valve is at the close position, and said combustion chamber is communicated with said tank through said first intake passage in the long state;

(ii) a second condition in which only one of said means for operating said cross-sectional area changing means and said means for operating said length changing means is actuated, said condition being formed during a higher engine speed operation than that of the first condition; and (iii) a third condition in which both said means for operating said cross-sectional area changing means and said means for operating said length changing means are actuated, said first intake passage is in the short state, and said valve is at the open position, said condition being formed during a higher engine speed operation than that of the second condition; thereby changing the natural frequency of the intake system according to the engine speed to obtain an inertia supercharging effect at various engine speeds.

2. An intake system for internal combustion engines are defined in claim 1 wherein said first and second passages are partly communicated with each other and a single fuel injection nozzle is provided in the passage at a part where it is not divided.

3. An intake system for internal combustion engines as defined in claim 1 further comprising another length changing means for elongating the effective length of said second intake passage wherein at said second condition said valve is at the open position and both said first and second passages are in the long state.

4. An intake system for internal combustion engines as defined in claim 1 wherein the cross-sectional area of one of said divided passages is different from that of another.

5. An intake system for internal combustion engines as defined in claim 1 wherein said passage is completely divided into two separate passages and in each of said passages is provided a fuel injection nozzle.

6. An intake system for internal combustion engines as defined in claim 1 wherein said intake passage is partly arranged in said surge tank between the outer casing of the surge tank and the wall of a cylindrical member provided therein, and a communication port is provided in the wall of the cylindrical member to make communication between the interior and the exterior of said cylindrical member, and said length changing means comprises means for changing the effective length of the intake passage between the combustion chamber and said communication port provided in the wall of the cylindrical member.

7. An intake system for internal combustion engines as defined in claim 6 wherein said length changing means is a change-over valve provided in said intake passage adjacent to said communication port to change-over the effective length of the intake passage between a long length composed of the first length of the passage extending from the combustion chamber to the wall of said cylindrical member and the second length of the passage around said cylindrical member, and a short length composed of said first length.

8. An intake system for internal combustion engines as defined in claim 1 wherein said cylindrical member is rotatable in the surge tank to change the angular position of said communication port, and said length changing means comprises a drive means for rotating said cylindrical member.

9. An intake system for internal combustion engines as defined in claim 8 wherein said drive means comprises a gear mechanism connected to the cylindrical member and an electric motor for driving the gear mechanism.

10. An intake system for internal combustion engines as defined in claim 1 wherein said operating means comprises a first actuator for operating said cross-sectional area changing means, a second actuator for operating said length changing means, and a control means for controlling the timing of operation by said first and second actuators.

11. An intake system for internal combustion engines as defined in claim 10 wherein said control means is connected with an engine speed sensor to receive an engine speed signal, and operates to control said actuators according to the engine speed signal.

12. An intake system for internal combustion engines as defined in claim 11 wherein said control means controls said first actuator to operate the cross-sectional area changing means to enlarge the cross-sectional area at a first engine speed and controls said second actuator to operate the length changing means to shorten the length at a second engine speed.

13. An intake system for internal combustion engines as defined in claim 12 wherein said first engine speed is lower than said second engine speed.

14. An intake system for internal combustion engines as defined in claim 12 wherein said first engine speed is higher than said second engine speed.

15. An intake system for internal combustion engines as defined in claim 11 wherein said control means controls said first actuator to operate the cross-sectional area changing means to enlarge the cross-sectional area at a first engine speed, and controls said second actuator to operate the length changing means to continuously shorten the length from a long level to a short level as the engine speed increases in a range between a second engine speed lower than said first speed and said first speed, return to the long level at said first speed, and continuously shorten the length from the long level to the short level as the engine speed increases in a range over a third engine speed higher than said first engine speed.

16. An intake system for internal combustion engines as defined in claim 10 wherein said second actuator operates to continuously change the length of the intake passage.

17. An intake system for internal combustion engines comprising an intake passage connected with an engine cylinder for introducing thereinto an intake gas, at least a part of said intake passage being composed of a first passage and a second passage parallel to each other, the upstream ends of said passages being connected to a tank to reflect a pressure wave generated in said cylinder and being transmitted through said passages; valve means provided in said second passage selectively taking a first position to substantially close said second passage to stop transmission of said pressure wave in the passage and a second position to open the same; first actuator means for changing over said valve means between the first position and the second position; length changing means including a change-over member provided at least in said first passage for changing the substantial length of said passage between said cylinder and said tank; and second actuator means operated independently of said first actuator means for actuating said change-over member between a long passage position and a short passage position, said first and second actuator means being adapted to be actuated according to the engine speed so as to form the following three conditions at different speeds:
 (i) a first condition in which said first intake passage is at the long passage position, said valve means is at the first position, and the combustion chamber is communicated with the tank through said first intake passage at the long passage position;
 (ii) a second condition in which only one of said first and second actuator means is actuated, said condition being formed during a higher engine speed operation than that of the first condition; and
 (iii) a third condition in which both said first and second actuator means are actuated, said first intake passage is at the short passage position, and said valve means is at the second position, said condition being formed during a higher engine speed operation than that of the second condition.

18. An intake system as defined in claim 17 wherein said length changing means has a second change-over member provided in said second passage for changing the length of the second passage, whereby the length of both the first and second passages is made changeable.

19. An intake system as defined in claim 18 wherein, at least in a high load range of the engine, said first actuator means operates to change-over the value means from the first position to the second position at an engine speed, and said second actuator means operates to change over the change-over member from the long passage position to the short passage position at an engine speed higher than said engine speed.

20. An intake system as defined in claim 17 wherein the engine is a multi-cylinder type engine and said tank is a surge tank provided in the intake passage.

21. An intake system for internal combustion engines as defined in claim 20 wherein said intake passage is partly arranged in said surge tank between the outer casing of the surge tank and the wall of a cylindrical member provided therein, and a communication port is provided in the wall of the cylindrical member to make communication between the interior and the exterior of said cylindrical member, and said length changing means comprises means for changing the effective length of the intake passage between the cylinder and said communication port provided in the wall of the cylindrical member.

22. An intake system for internal combustion engines as defined in claim 21 wherein said length changing means is a change-over valve provided in said intake passage adjacent to said communication port to change-over the effective length of the intake passage between the long length composed of the first length of the passage extending from the cylinder to the wall of said cylindrical member and the second length of the passage around said cylindrical member, and the short length composed of said first length.

23. An intake system for internal combustion engines as defined in claim 21 wherein said cylindrical member is rotatable in the surge tank to continuously change the angular position of said communication port, and said length changing means comprises a drive means for rotating said cylindrical member.

24. An intake system as defined in claim 17 wherein said first passage includes a longer passage and a shorter passage respectively connected to said tank independently of each other and said change-over member operates to close the shorter passage when the engine speed is low.

25. An intake system as defined in claim 24 wherein said second passage further includes a longer passage and a shorter passage respectively connected to said tank independently of each other and said change-over member operates to close the shorter passage when the engine speed is low.

26. An intake system as defined in claim 25 wherein at least in a high load range of the engine, said first actuator means operates to change over the valve means from the first position to the second position at an engine speed, and said second actuator means operates to change over the change-over member from the long passage position to the short passage position at an engine speed higher than said engine speed.

27. An intake system as defined in claim 17 wherein said intake passage is completely divided into two separate passages and in each of said passages is provided a fuel injection nozzle.

* * * * *